(12) United States Patent
Davis et al.

(10) Patent No.: US 12,712,944 B2
(45) Date of Patent: Aug. 18, 2026

(54) SYSTEMS AND METHODS FOR INFORMATION RETRIEVAL OF POWER TOOLS IN A MESH NETWORK

(71) Applicant: Milwaukee Electric Tool Corporation, Brookfield, WI (US)

(72) Inventors: Anthony M. Davis, Brookfield, WI (US); Johnny Lienau, Glendale, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 80 days.

(21) Appl. No.: 18/689,391

(22) PCT Filed: Sep. 9, 2022

(86) PCT No.: PCT/US2022/043032

§ 371 (c)(1),
(2) Date: Mar. 5, 2024

(87) PCT Pub. No.: WO2023/039148

PCT Pub. Date: Mar. 16, 2023

(65) Prior Publication Data

US 2024/0388628 A1 Nov. 21, 2024

Related U.S. Application Data

(60) Provisional application No. 63/242,719, filed on Sep. 10, 2021.

(51) Int. Cl.

| | |
|---|---|
| ***H04L 12/24*** | (2006.01) |
| ***B25F 5/00*** | (2006.01) |
| ***H04L 41/0803*** | (2022.01) |
| ***H04L 67/12*** | (2022.01) |

(52) U.S. Cl.
CPC ................ *H04L 67/12* (2013.01); *B25F 5/00* (2013.01)

(58) Field of Classification Search
CPC .................................. H04L 67/12; B25F 5/00
USPC .......................................................... 709/238
See application file for complete search history.

(56) References Cited

U.S. PATENT DOCUMENTS

| | | | | |
|---|---|---|---|---|
| 8,657,482 | B2 * | 2/2014 | Malackowski | H02K 11/33 366/601 |
| 9,533,403 | B2 * | 1/2017 | Lee | B25B 23/14 |
| 10,631,120 | B2 | 4/2020 | Burch et al. | |
| 2010/0204685 | A1 * | 8/2010 | Ippisch | A61B 17/1626 606/1 |

(Continued)

FOREIGN PATENT DOCUMENTS

| | | | |
|---|---|---|---|
| EP | 3687024 A1 * | 7/2020 | H04W 4/80 |

*Primary Examiner* — Moustafa M Meky
*Assistant Examiner* — Elizabeth Kassa
(74) *Attorney, Agent, or Firm* — Quarles & Brady LLP

(57) ABSTRACT

A power tool (108) and a gateway power tool (102) are provided and include a body, an actuator, an antenna (240), and an electronic controller (210) in communication with the antenna (240), The electronic controller (210) includes a processor (200) configured to in response to an event, establish communication with a mesh network that includes the power tool (108) and an additional power tool (102), transmit, via the mesh network, tool information to the additional power tool (102), and cease communicating with the mesh network after transmitting the tool information to the additional power tool (102).

20 Claims, 6 Drawing Sheets

(56) References Cited

U.S. PATENT DOCUMENTS

2010/0318093 A1* 12/2010 Ippisch .............. A61B 17/1626
606/104
2013/0109375 A1* 5/2013 Zeiler ................... H04W 12/12
455/552.1
2015/0045929 A1* 2/2015 Lee ......................... B23P 19/06
700/114
2017/0222382 A1* 8/2017 Peloquin ................... B25F 5/00
2019/0222957 A1* 7/2019 Burch ................... H04W 4/021
2021/0012980 A1* 1/2021 Nieh ...................... H01H 21/22
2022/0314819 A1* 10/2022 Harvey ................... B60L 50/64
2024/0168461 A1* 5/2024 Dey, IV .............. G06F 3/04842

* cited by examiner

SYSTEMS AND METHODS FOR INFORMATION RETRIEVAL OF POWER TOOLS IN A MESH NETWORK

RELATED APPLICATIONS

The present application is based on and claims priority from U.S. Patent Application No. 63/242,719, filed on Sep. 10, 2021, the entire disclosure of which is incorporated herein by reference.

BACKGROUND

Work tools (e.g., power tools) allow operators to implement various functionalities on many different components (e.g., electrical wires, power cables, sheet metal, etc.). For example, some power tools can include a cutting head that is driven (e.g., hydraulically, or electrically) into a component, such as a power wire, to cut through the component.

SUMMARY

Some embodiments of the disclosure provide a power tool. The power tool can include a body, an actuator coupled to the body, an antenna coupled to the body, and an electronic controller coupled to the body and in communication with the antenna. The electronic controller can include a processor that can be configured to, in response to an event, establish communication with a mesh network that includes the power tool and an additional power tool, transmit, via the mesh network, tool information to the additional power tool, and cease communicating with the mesh network after transmitting the tool information to the additional power tool.

Some embodiments of the disclosure provide a method for tool information retrieval. The method can include, in response to an event, establishing, using a power tool, communication with a mesh network that includes the power tool and an additional power tool, transmitting, using the power tool, tool information to an additional power tool, and ceasing communication with the mesh network after transmitting the tool information to the additional power tool.

Some embodiments of the disclosure provide a gateway power tool. The gateway power tool can include a body, an actuator coupled to the body, an antenna coupled to the body, and an electronic controller coupled to the body and in communication with the antenna. The electronic controller can include a processor that can be configured to, in response to an event, establish communication with a mesh network that includes the gateway power tool and an additional power tool, receive, via the mesh network, tool information from the additional power tool, transmit the tool information to a wireless communication device, and cease communication with the mesh network after transmitting the tool information to the wireless communication device.

Some embodiments of the disclosure provide a power tool device. The power tool can include a body, an antenna coupled to the body, and an electronic controller coupled to the body and in communication with the antenna. The electronic controller can include a processor that can be configured to, in response to an event, establish communication with a mesh network that includes the power tool device and an additional power tool device, transmit, via the mesh network, power tool device information to the additional power tool device, and cease communicating with the mesh network after transmitting the power tool device information to the additional power tool device. In some examples, the power tool device may be a power tool or a power tool battery pack, and the additional power tool device may be a power tool or power tool battery pack.

Some embodiments of the disclosure provide a method for power tool device information retrieval. The method can include, in response to an event, establishing, using a power tool device, communication with a mesh network that includes the power tool device and an additional power tool device, transmitting, using the power tool device, power tool device information to an additional power tool device, and ceasing communication with the mesh network after transmitting the power tool device information to the additional power tool device. In some examples, the power tool device may be a power tool or a power tool battery pack, and the additional power tool device may be a power tool or power tool battery pack.

Some embodiments of the disclosure provide a gateway power tool device. The gateway power tool device can include a body, an antenna coupled to the body, and an electronic controller coupled to the body and in communication with the antenna. The electronic controller can include a processor that can be configured to, in response to an event, establish communication with a mesh network that includes the gateway power tool device and an additional power tool device, receive, via the mesh network, power tool device information from the additional power tool device, transmit the power tool device information to a wireless communication device, and cease communication with the mesh network after transmitting the power tool device information to the wireless communication device. In some examples, the gateway power tool device may be a power tool or a power tool battery pack, and the additional power tool device may be a power tool or power tool battery pack.

BRIEF DESCRIPTION OF THE DRAWINGS

The accompanying drawings, which are incorporated in and form a part of this specification, illustrate embodiments of the disclosure and, together with the description, serve to explain principles of the embodiments.

DETAILED DESCRIPTION

Figure 1:
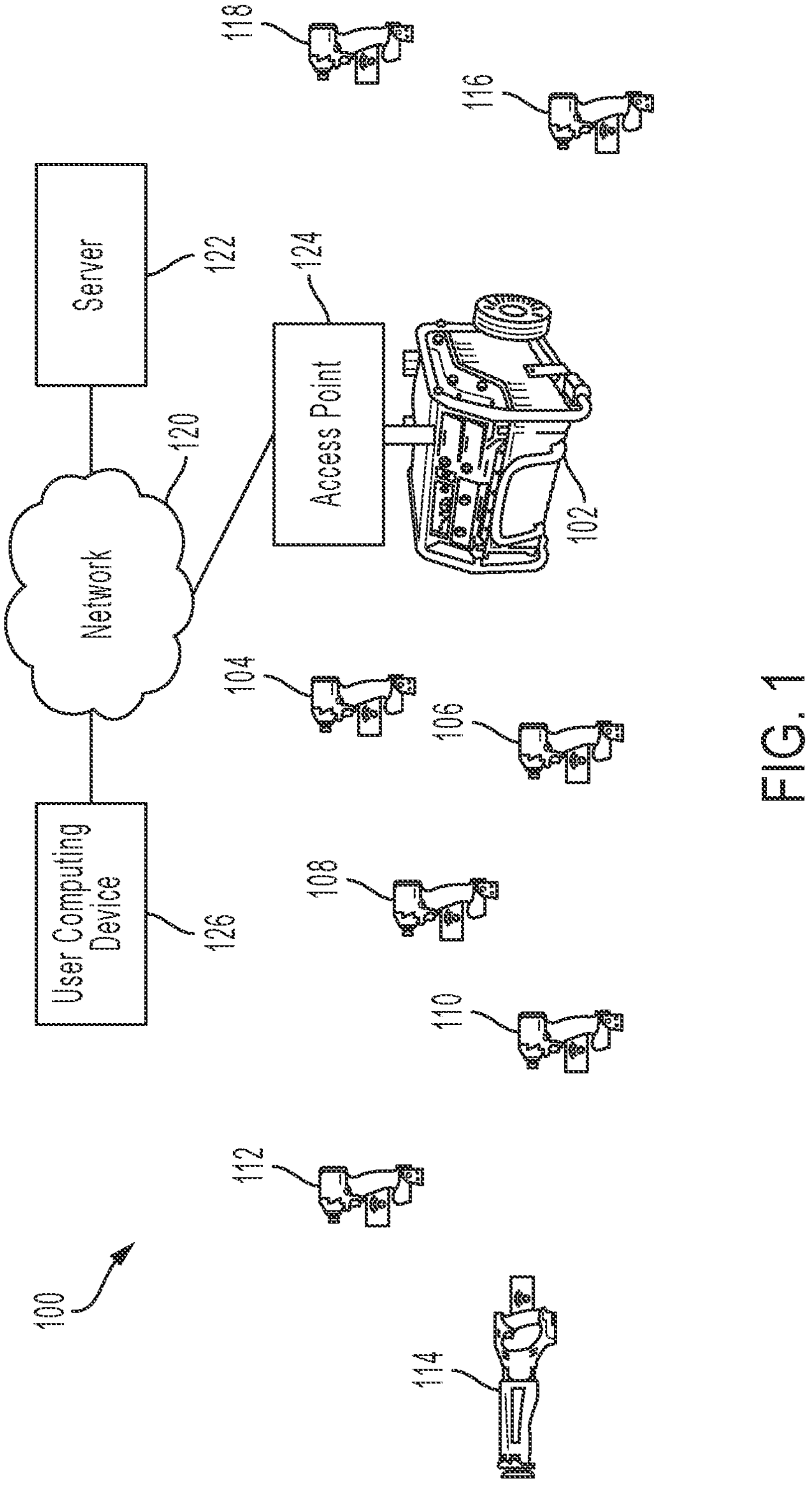
FIG. 1 is a schematic illustration of a power tool system.

As described above, power tools generally can implement various functionalities on different components or workpieces. For example, power tools generally can include an actuator including a moveable component that when moved into contact with the component, implements some kind of functionality on the component. For example, when the power tool is implemented as a cutting tool, the actuator of the cutting tool can include a cutting head that can, when moved into contact with a work piece (e.g., a wire to be cut) sever the work piece in two. As another example, when the power tool is implemented as a crimping tool, the actuator of the crimping tool can include a crimping head that can, when moved into contact with a work piece (e.g., a wire to be crimped), crimp the work piece (e.g., to create an electrical connection to the wire). As another example, when the power tool is a drill-driver, the actuator of the power tool may be a drill chuck configured to accept and retain a drill or driver bit and that is driven by the power tool to rotate the retained bit to, for example, drill a hole in a workpiece (in the case of a drill bit) or drive a fastener into a workpiece (in the case of a drive bit).

Some power tools can include an electronic controller that can control various features of the tool. For example, the electronic controller can drive extension (or rotation or oscillation) of the actuator to implement a functionality on a work piece, or can drive retraction (or rotation in the opposing direction) of the actuator (e.g., after the functionality has been completed or to remove a fastener).). In some embodiments, the electronic controller of the power tool can receive data from sensors of the power tool, which can augment the control of the actuator. For example, one sensor can be a trigger sensor that is coupled to the power tool. When a trigger of the power tool is actuated (e.g., depressed by an operator), the trigger sensor may sense and indicate the trigger depression to the electronic controller, which controls the actuator (e.g., to extend, rotate, or oscillate) to implement the functionality of the power tool.

In some cases, multiple different power tools can be located at different positions within a location (e.g., a bounded geographic location, a jobsite, etc.), and it can be desirable to periodically transmit tool information (e.g., a tool identification such as a serial number, a total number of seconds of or during operation of a tool, a total number of seconds of or during actuation of an actuator of the respective tool, a total number of driving operations for an actuator of the respective tool, a location of the respective tool, a tool identifier including a tool type, etc.) to a wireless communication device (e.g., a smart phone, a laptop, a server, a cellular tower, router, etc.). However, sometimes power tools can be positioned at locations that are too far away from the wireless communication device and, thus, direct communication between the power tool and the wireless communication device is prevented due to the power tool exceeding the direct wireless communication range of the wireless communication device. In some cases, the power tool can lack the tool footprint needed for some wireless communication protocols (e.g., a cellular wireless communication protocol). For example, the housing of some power tools can be too small to adequately fit electronics needed for some wireless communication protocols (e.g., additional antennas, additional communication electronics including additional wireless modules, etc.). Thus, if these power tools are situated too far from the wireless communication device thereby exceeding the direct wireless communication range of the wireless communication device, these power tools are unable to transmit information to the wireless communication device. The wireless communication device may be fixed at a location (permanently or semi-permanently) or mobile (e.g., portable).

Some embodiments described herein provide solutions to these problems (and others) by providing improved systems and methods for information retrieval of power tools in a mesh network. For example, some embodiments of the disclosure provide a power tool system that can include a plurality of power tools. The power tools can communicate with each other via a mesh network that includes the plurality of power tools. In this way, tool information associated with different power tools can be disseminated through the mesh network, which can mitigate issues with some power tools exceeding the direct wireless communication range of a wireless communication device. In other words, because power tools can communicate with each other via a mesh network, tool information can be disseminated further through a mesh network, providing wireless communications that are less dependent on the direct wireless communication range of a power tool (e.g., assuming the power tools are in the mesh network).

In some embodiments, some of the plurality of power tools of the power tool system can be gateway power tools. For example, each of the gateway power tools can communicate via the mesh network, and in addition, can also communicate to a wireless communication device (e.g., a cell tower). In this way, each gateway power tool can receive tool information from other power tools in the mesh network, including those power tools that lack the ability to communicate using some other wireless communication protocols (e.g., a cellular communication protocol). Then, each gateway power tool can transmit the received tool information to a wireless communication device (e.g., a cellular tower). In this way, the tool information can be received by the wireless communication device, without the need for each power tool to directly communicate with the wireless communication device. Thus, this process can be more efficient at least because the number of direct communication transmissions can be significantly decreased (e.g., because the gateway power tool can transmit tool information from a plurality of other power tools to the wireless communication device), and this configuration can provide power tools that are less costly, more compact, and/or more power efficient. For example, because only the gateway power tools may communicate with a wireless communication device, the other power tools may not include electronics for higher-power (longer range) communications with the wireless communication device, which can be large and/or expensive (e.g., additional wireless modules, additional antennas, additional receivers, etc.).

In some embodiments, each power tool of the power tool system can periodically establish communication with a mesh network (e.g., establishing the mesh network), which can include each of the power tools, and can periodically cease communicating with the mesh network (e.g., leaving the mesh network). In some cases, this can advantageously conserve power from a power source of the power tool (e.g., a battery pack). For example, continuously communicating with a mesh network can drain the power source of the power tool, and thus the periodically establishing (and ceasing) communication with a mesh network can (1) disseminate tool information within the mesh network (e.g., when communicating with the mesh network), and (2) can conserve power by ceasing communication with the mesh network (e.g., because tool information may not be needed to be continuously disseminated through the mesh network).

In some embodiments, each power tool of the power tool system can include one or more antennas (e.g., as part of one or more Bluetooth® wireless modules) that are capable of communicating with other devices (e.g., other power tools) according to a Bluetooth® wireless protocol, which can have advantages as compared to other wireless protocols (e.g., using less power to communicate, providing fast communication speeds, ensuring one-to-one pairing between devices at some times, etc.). Thus, in some cases, the mesh network can be a Bluetooth® mesh network. In this case, for example, the direct communication range between the wireless communication device and a respective power tool can be fairly short (e.g., 25 or 30 feet), but by using the Bluetooth® mesh network, the indirect communication range can be increased considerably as compared to the direct communication range.

FIG. 1 shows a schematic illustration of a power tool system 100. The power tool system 100 can include power tools 102, 104, 106, 108, 110, 112, 114, 116, 118, which can be implemented in different ways. For example, each power tool 102, 104, 106, 108, 110, 112, 114, 116, 118 can include an actuator, a power source (e.g., a battery pack), an electronic controller, a power source interface (e.g., a battery pack interface), etc. In some cases, each power tool 102, 104, 106, 108, 110, 112, 114, 116, 118 can be different, can be the same, etc. For example, one or more of the power tools 102, 104, 106, 108, 110, 112, 114, 116, 118 can be an impact driver, a power drill, a hammer drill, a pipe cutter, a sander, a nailer, a grease gun, a crimper, any other suitable tool that can send data to another device, etc. Regardless of the configuration, each power tool 102, 104, 106, 108, 110, 112, 114, 116, 118 can be configured to directly communicate with each other (e.g., over a wireless communication channel). In some configurations, each power tool 104, 106, 108, 110, 112, 114, 116, 118 can directly communicate with each other according to a wireless protocol, which can be a Bluetooth® wireless protocol.

In some embodiments, each power tool 102, 104, 106, 108, 110, 112, 114, 116, 118 can be a motorized power tool, or a non-motorized power tool. In some cases, each motorized power tool can include a moveable component and an actuator that can move (e.g., translate, rotate, reciprocate, oscillate, etc.) the moveable component to implement a functionality on a workpiece. For example, a motorized power tool can be a drill, an impact driver, a crimper, a cutter, etc. In some configurations, each non-motorized power tool can lack an actuator, a moveable component, etc., and thus can lack the ability to implement a functionality on a workpiece. For example, a non-motorized power tool can be a radio, a speaker, a power supply (e.g., a portable power supply), etc. As a more specific example, and as shown in FIG. 1, the power tool 102 can be a portable power supply that can include a power source (e.g., an AC power source, a DC power source, etc.), one or more power outlets (e.g., AC or DC outlets) that can be in electrical communication with the power source, one or more charging ports (e.g., for charging a battery pack of a power tool), etc.

In some embodiments, one or more of the power tools 102, 104, 106, 108, 110, 112, 114, 116, 118 can be a gateway power tool. For purposes of explanation herein, the power tool 102 is described as a gateway power tool and, accordingly, may also be referred to as the gateway power tool 102. In other embodiments, one or more other of the power tools 104, 106, 108, 110, 112, 114, 116, and/or 118 may be a gateway power tool. As described in further detail with respect to FIG. 3, the gateway power tool 102 can be configured to communicate with a wireless communication device (e.g., an access point 124 of a network 120), and can also be configured to communicate with each of the other power tools of the power tool system 100. In some cases, each gateway power tool, including the gateway power tool 102, can communicate with each of the other power tools using a first wireless communication protocol, and can communicate with the wireless communication device using a second wireless communication protocol (e.g., different from the first wireless communication protocol).

In some embodiments, some of the power tools 104, 106, 108, 110, 112, 114, 116, 118 can be unable to directly communicate with a wireless communication device, such as an access point 124 (e.g., a router, modem, hub, cellular tower) of the network 120. For example, some of the power tools 104, 106, 108, 110, 112, 114, 116, 118 are not capable of communicating using a wireless communication protocol of the wireless communication device (e.g., a cellular communication protocol, any cellular communication protocols, a WiFi communication protocol, etc.). In some cases, this can be due to some of the power tools 104, 106, 108, 110, 112, 114, 116, 118 lacking electronics that facilitate communication using the wireless communication protocol of the wireless communication device (e.g., lacking a wireless module that facilitates communication using the wireless communication protocol).

In some embodiments, each power tool 102, 104, 106, 108, 110, 112, 114, 116, 118 can include a tool identifier associated therewith, each of which uniquely identifies the respective power tool from other power tools. For example, the tool identifier can be a media access control ("MAC") address, a serial number, other unique identification information, etc. In some configurations, each tool identifier can define a tool type for the respective power tool (e.g., the tool being a specific type of power tool including, for example, a crimper or impact driver). In some embodiments, each power tool 102, 104, 106, 108, 110, 112, 114, 116, 118 can include an electronic controller, which can acquire tool information for the respective tool. For example, the electronic controller can determine tool information for a given power tool, which can include determining a tool identification for the given tool, determining a total amount of time during operation of the respective tool (e.g., a total amount of time that the power tool has been powered on in its lifetime, after a repair, during the current on cycle, etc.), determining a total amount of time during actuation of an actuator of the respective tool (e.g., a total amount of time the actuator of the power tool has moved during its lifetime, after a repair, during the current on cycle, etc.), determining a total number of driving operations for an actuator of the power tool (e.g., a total number of times the actuator has been cycled during its lifetime, after a repair, during the current on cycle, etc.), determining a location of the respective tool (e.g., using a location sensor, which can include a GPS sensor), etc.

In some embodiments, the power tool system 100 can include a network 120, a server 122, an access point 124, and a user computing device 126. Generally, each of the gateway power tools of the power tool system 100 (e.g., the gateway power tool 102) can communicate with the server 122 via the access point 124 and the network 120. More particularly, each gateway power tool can communicate with an access point 124 of the network 120 to communicate with the server 122 over the network 120. An access point can include, for example, a cellular tower, a Wi-Fi router, a hub, etc. Additionally, a gateway power tool can serve as a gateway device to enable one or more of the other power tools (e.g., those that are not capable of communicating using cellular wireless communication protocol) to communicate with the server 122 (again, via access point 124 and the network 120).

The network 120 may include one or more local area networks and/or one or more wide area networks coupled together, which may include various wired and wireless connections and interfaces, intermediate devices, access points, hubs, routers, modems, and the like. For example, the network 120 may include a local area WiFi network including a WiFi router as well as a wide area network, such as the Internet, connected to the WiFi router via a modem, and the intervening connections and devices typical of such networks. The network 120 may further include respective local area networks proximate to each of the server 122 and the user computing device 126.

The server 122 may include one or more server processors and memories in a localized unit or distributed across multiple units in one or more locations (e.g., implementing a cloud-based system). The server 122 can store tool data for various power tools (e.g., the power tools of the power tool system 100) including tool information, which can include configuration data for the power tools (e.g., to configure operational parameters of the power tool), usage data for the power tools (e.g., an amount of time available for operation for each power tool), maintenance data for the power tools (e.g. a log of prior maintenance, suggestions for future maintenance, etc., for each power tool), operator (and owner information) for the power tools, location data for each power tool (e.g., for inventory management and tracking), etc. The server 122 can also store battery pack data for various battery packs of the power tool system 100 including battery pack information. In some cases, one power tool of the power tool system 100 (e.g., a gateway power tool) can periodically or occasionally attempt to communicate one or more types of tool information back to the server 122 (e.g., via the access point 124 and the network 120), or to otherwise communicate with the server 122 or access points of the power tool system 100.

The user computing device 126 may be a laptop, desktop, tablet, smart phone, or other personal computing device. The user computing device 126 may include a processor, memory, communication interface for communicating via the network 120 with other devices (e.g., the server 122), and one or more human interface devices (e.g., display, keyboard, mouse, touch screen display, etc.).

The particular number, types, and locations of components with the power tool system 100 of FIG. 1 are merely used as an example for discussion purposes, and thus additional or different types of power tools, networks 120, servers 122, access points 124, and user computing devices 126 can be present in other embodiments of the power tool system 100.

In some embodiments, each power tool 102, 104, 106, 108, 110, 112, 114, 116, 118, can establish a mesh network, with some (or all) of the power tools 102, 104, 106, 108, 110, 112, 114, 116, 118 (and others not shown in FIG. 1). In this way, tool information (or other information) can be disseminated through the mesh network, ultimately being received by a wireless communication device (e.g., the access point 124), and/or the server 122. Thus, even if some of the power tools of the power tool system 100 exceed the direct communication range of a gateway power tool (e.g., being positioned at locations too far from the gateway power tool and thus unable to directly communicate with the gateway power tool), other power tools of the power tool system 100 can act as nodes to establish indirect communication between the gateway power tool and the power tools that exceed the direct communication range. As such, tool information for each power tool, regardless of its location relative to a gateway power tool, can ultimately be received by the gateway power tool (e.g., assuming there are nodes to establish indirect communication).

In some embodiments, while each of the power tools 102, 104, 106, 108, 110, 112, 114, 116, 118 have been described as being a node of the mesh network (e.g., when established), in some embodiments, the power tool system 100 can include one or more other wireless communication devices (referred to as mesh nodes) that can be in communication with each power tool of the power tool system 100 via the mesh network. In some cases, each of these mesh nodes can include a power source, an antenna, a receiver, an electronic controller, etc., and each of these can be configured to communicate according to a Bluetooth® wireless protocol. In some configurations, the mesh network can be a Bluetooth® mesh network.

Figure 2:
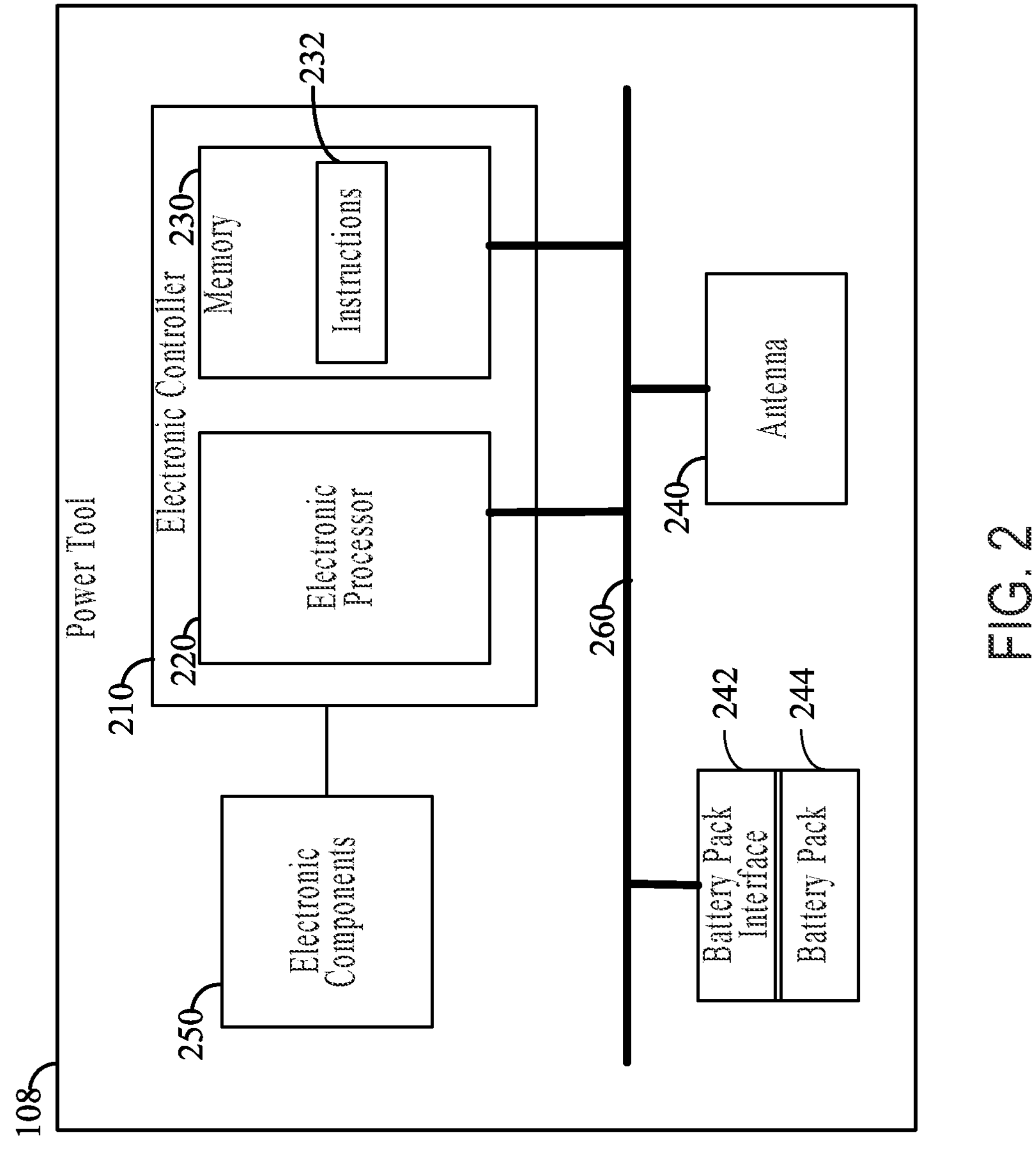
FIG. 2 shows a block diagram of a power tool.

FIG. 2 shows a block diagram of an example of the power tool 108. In the example illustrated, the power tool 108 can include an electronic controller 210, an antenna 240, electronic components 250, among other components. The electronic controller 210 can include an electronic processor 220 and a memory 230. The electronic processor 220, the memory 230, and the antenna 240 can communicate over one or more control buses, data buses, etc., which can include a device communication bus 260. The electronic processor 220 can be configured to communicate with the memory 230 to store data and retrieve stored data. The electronic processor 220 can be configured to receive instructions and data from the memory 230 and execute, among other things, the instructions. In particular, the electronic processor 220 executes instructions stored in the memory 230. Thus, the electronic controller 210 coupled with the electronic processor 220 and the memory 230 can be configured to perform the methods described herein (e.g., the process 400 of FIG. 4).

The memory 230 can include read-only memory (ROM), random access memory (RAM), other non-transitory computer-readable media, or a combination thereof. The memory 230 can include instructions 232 for the electronic processor 220 to execute. The instructions 232 can include software executable by the electronic processor 220 to enable the electronic controller 210 to, among other things, receive and transmit tool information for a location (e.g., in which the power tool system 100 resides) and to perform other functionality of the power tool 108 described herein, including the process 400 of FIG. 4.

The antenna 240 can be communicatively coupled to the electronic controller 210. The antenna 240 enables the electronic controller 210 (and, thus, the power tool 108) to communicate with other devices, such as a cellular tower, a Wi-Fi router, a mobile device, other power tools, gateway power tools, or other devices of the system 100. In some configurations, although the power tool 108 may communicate wirelessly according to one or some wireless communication protocols, the power tool 108 may be unable to communicate according to one or more other wireless communication protocols. For example, the power tool 108 can be unable to communicate according to a cellular communication protocol (or any cellular communication protocol) of a wireless communication device, such as a cellular tower serving as the access point 124. As a more specific example, the power tool 108 can lack the electronics needed for communication according to a cellular communication protocol, but may include a wireless communication module, such as a Bluetooth® wireless module. In some examples, the antenna 240 can further include a GNSS receiver configured to receive signals from GNSS satellites, land-based transmitters, etc.

In some embodiments, the power tool 108 also optionally includes a power tool battery pack interface 242 that is configured to selectively receive and interface with a power tool battery pack 244. The pack interface 242 can include one or more power terminals and, in some cases, one or more communication terminals that interface with respective power terminals, communication terminals, etc., of the power tool battery pack 244. The power tool battery pack 244 can include one or more battery cells of various chemistries, such as lithium-ion (Li-Ion), nickel cadmium (Ni-Cad), etc. The power tool battery pack 244 can further selectively latch and unlatch (e.g., with a spring-biased latching mechanism) to the power tool 108 to prevent unintentional detachment. The power tool battery pack 244 can further include a pack electronic controller (pack controller) including a processor and a memory. The pack controller can be configured similarly to the electronic controller 210 of the power tool 108. The pack controller can be configured to regulate charging and discharging of the battery cells, and/or to communicate with the electronic controller 210. In some embodiments, the power tool battery pack 244 can further include an antenna, similar to the antenna 240, coupled to the pack controller via a bus similar to bus 260. Accordingly, the pack controller, and thus the power tool battery pack 244, can be configured to communicate with other devices, such as the cellular tower, the Wi-Fi router, the mobile device, other power tools, gateway power tools, other battery packs, or other devices of the system 100. In some embodiments, the memory of the pack controller can include the instructions 232. The power tool battery pack 244 can further include, for example, a charge level fuel gauge, analog front ends, sensors, etc.

The power tool battery pack 244 can be coupled to and configured to power the various components of the power tool 108, such as the electronic controller 210, the antenna 240, and the electronic components 250. However, to simplify the illustration, power line connections between the pack 244 and these components are not illustrated.

In some embodiments, the power tool 108 can also optionally include electronic components 250. For a motorized power tool (e.g., drill-driver, reciprocating saw, circular saw, cutter, crimper, sander, etc.), the electronic components 250 can include, for example, an inverter bridge, a motor (e.g., brushed or brushless) for driving a tool implement, etc. For a non-motorized power tool (e.g., a work light, a work radio, ruggedized tracking device, etc.), the electronic components 250 can include, for example, one or more of a lighting element (e.g., an LED), an audio element (e.g., a speaker), a power source, etc. In some embodiments, the antenna 240) can be within a separate housing along with the electronic controller or another electronic controller, and that separate housing selectively attaches to the power tool 108. For example, the separate housing may attach to an outside surface of the power tool 108 or may be inserted into a receptacle of the power tool 108. Accordingly, the wireless communication capabilities of the power tool 108 can reside in part on a selectively attachable communication device, rather than integrated into the power tool 108. Such selectively attachable communication devices can include electrical terminals that engage with reciprocal electrical terminals of the power tool 108 to enable communication between the respective devices and enable the power tool 108 to provide power to the selectively attachable communication device. In other embodiments, the antenna 240) can be integrated into the power tool 108.

Although described with respect to the power tool 108, in some embodiments, the diagram of FIG. 2 also applies to one or more of the other power tools of the power tool system 100 (e.g., the power tools 104, 106, 110, 112, 114, 116, and/or 118). The diagram of FIG. 2 can also apply to some embodiments of the battery pack 244, except that, in a power tool battery pack implementation, the battery pack interface 242 and the battery pack 244 of the diagram are replaced with a tool interface (to interface with a battery pack interface of a power tool). In the case of the power tool battery pack implementation, the electronic component 250) can include, for example, one or more battery cells, a charge level fuel gauge, analog front ends, sensors, etc.

Figure 3:
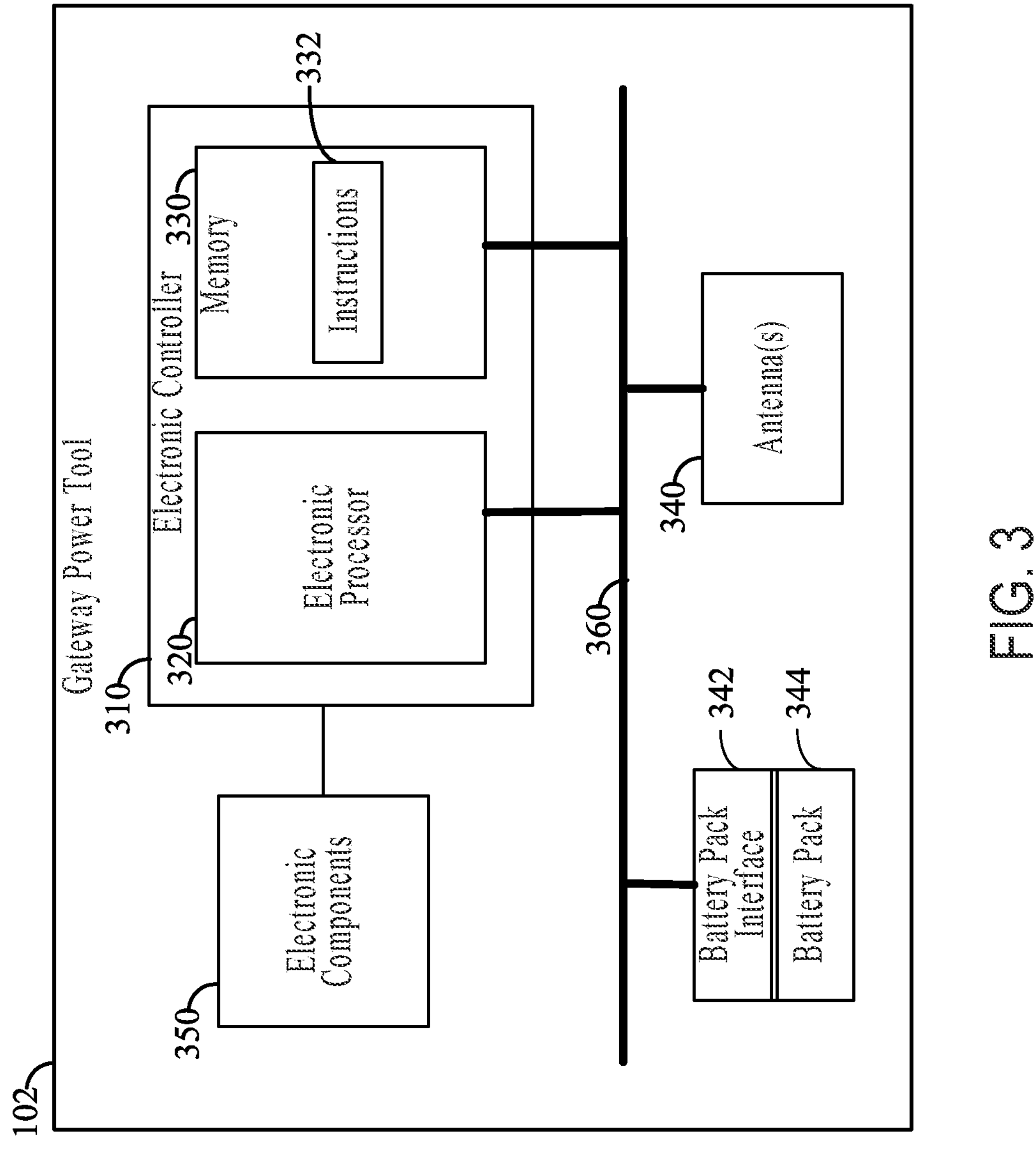
FIG. 3 shows a block diagram of a gateway power tool.

FIG. 3 shows a block diagram of an example of the gateway power tool 102, which can also pertain to the other gateway power tools described herein. The gateway power tool 102, similar to the power tool 108, can include an electronic controller 310, antenna(s) 340), a battery pack interface 342, a battery pack 344, electronic components 350, and a bus 360. In some embodiments, the electronic controller 310 can be similar to the electronic controller 210, the battery pack interface 342 can be similar to the battery pack interface 242, the battery pack 344 can be similar to the battery pack 244, the antenna(s) 340 can be similar to the antenna 240, the electronic components 350 can be similar to the electronic components 250, and the bus 360 can be similar to the bus 260. For example, the electronic controller 310 can include an electronic processor 320 and memory 330. The electronic processor 320, the memory 330, and the antenna(s) 340 can communicate over one or more control buses, data buses, etc., which can include the communication bus 360. The electronic processor 320 can be configured to communicate with the memory 330 to store data and retrieve stored data. The electronic processor 320 can be configured to receive instructions and data from the memory 330 and execute, among other things, the instructions. In particular, the electronic processor 320 can execute instructions stored in the memory 330. Thus, the electronic controller 310 coupled with the electronic processor 320 and the memory 330 can be configured to perform the methods described herein (e.g., the process 500 of FIG. 5).

The memory 330 can include ROM, RAM, other non-transitory computer-readable media, or a combination thereof. The memory 330 can include instructions 332 for the electronic processor 320 to execute. The instructions 332 can include software executable by the electronic processor 320 to enable the electronic controller 310 to, among other things, transmit and receive tool information from one or more power tools for a location and to perform other functionality of the gateway power tool 102 described herein, including the process 600 of FIG. 6.

The antenna(s) 340 can be communicatively coupled to the electronic controller 310. The antenna(s) 340 can enable the electronic controller 310 (and, thus, the gateway power tool 102) to communicate with other devices, such as a cellular tower, a Wi-Fi router, a mobile device, other power tools, battery packs, and other devices in the system 100. In some examples, the antenna(s) 340 can include a GNSS receiver configured to receive signals from GNSS satellites, land-based transmitters, etc.

In some embodiments, the gateway power tool 102 can include electronic components 350 including, for example, an actuator that is configured to implement a functionality on a workpiece. In other cases, however, the gateway power tool 102 can lack some or all of the electronic components 350 including, for example, the actuator that is configured to implement a functionality on a workpiece.

As noted above, in some cases, the gateway power tool 102 can communicate with other power tools of the system 100 (e.g., the power tools 104, 106, 108, 110, 112, 114, 116, and/or 118) using a first wireless communication protocol, and can communicate with a wireless communication device (e.g., the access point 124) using a second wireless communication protocol (e.g., different from the first wireless communication protocol). For example, the first wireless communication protocol can be a Bluetooth® wireless communication protocol (e.g., to form a Bluetooth® mesh network with each other power tools), and the second wireless communication protocol can be a cellular communication protocol (e.g., a 3G protocol, a 4G protocol, a 5G protocol, etc.), a Wi-Fi communication protocol, etc. In some configurations, each gateway power tool can include a first antenna, and a second antenna different from the first antenna. In some configurations, a gateway tool can use the first antenna to communicate according to the first wireless communication protocol, and the gateway tool can use the second antenna to communicate according to the second wireless communication protocol. In this way, the gateway power tool can utilize different antennas for different communication protocols because some wireless communication protocols can require or have improved operation with different antennas. In other cases, each gateway power tool can include a single antenna (e.g., a single transceiver) that is configured to communicate according to the first wireless communication protocol and the second wireless communication protocol. For example, the single antenna can be a 2.4 GHz antenna, which can be utilized for both Bluetooth® communication protocols and cellular communication protocols.

Figure 4:
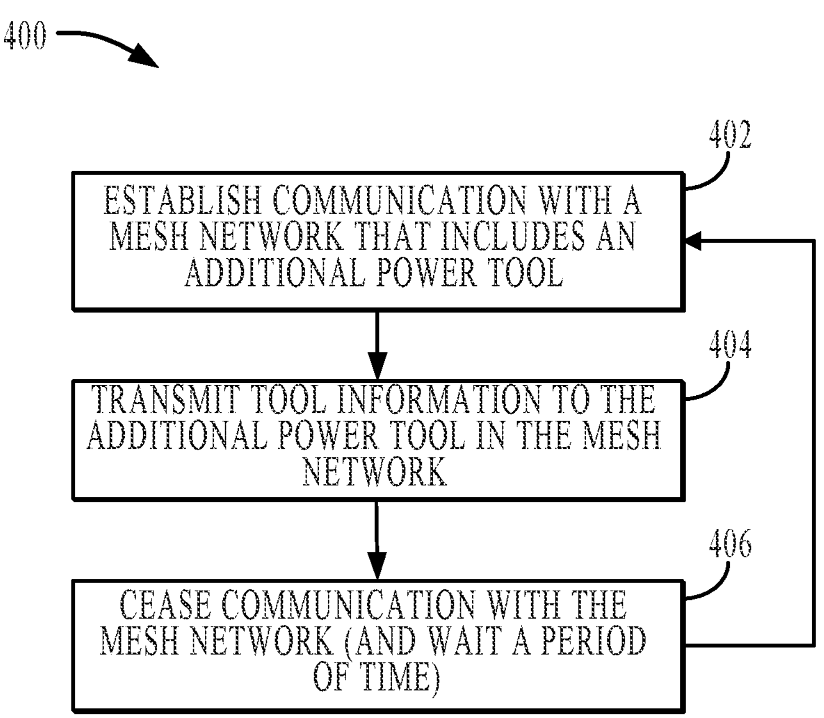
FIG. 4 shows a flowchart of a process for tool information retrieval.

FIG. 4 illustrates a flowchart of a process 400 for tool information retrieval for a location (e.g., a jobsite), which can be implemented using any of the systems described herein (e.g., the power tool system 100). However, in some embodiments, the process 400 is implemented by another system having additional components, fewer components, alternative components, etc. In some specific cases, the process 400 can be implemented using a power tool (e.g., the power tool 108). Additionally, although the blocks of the process 400 are illustrated in a particular order, in some embodiments, one or more of the blocks can be executed partially or entirely in parallel, can be executed in a different order than illustrated in FIG. 4, or can be bypassed. For illustration purposes, the process 400 is generally described as being implemented by the power tool 108 in the context of the power tool system 100 in FIG. 1. However, in other embodiments, other power tools or devices of the system 100 (e.g., the power tools 102, 104, 106, 110, 112, 114, 116, or 118), or other power tools or devices of other systems, can implement the process 400.

In block 402, the process 400 can include a power tool (e.g., the power tool 108) establishing communication with a mesh network that includes an additional power tool (e.g., and in some cases multiple additional power tools), which can be in response to an event. The event, which also may be referred to as a mesh network triggering event, can be defined or implemented in different ways. For example, the event can include an elapsed time having exceeded a time threshold. In this case, the elapsed time can be determined by the electronic controller 210 of the power tool 108 (e.g., using clock signals of a clock of the electronic controller 210), and can be defined in different ways. For example, the elapsed time can begin under different conditions, such as, in response to the power tool being powered on (e.g., a power button on the power tool has been actuated), in response to the power tool having transmitted tool information (e.g., after the block 404), in response to the power tool having ceased communication with the mesh network (e.g., after the block 406), etc. In some cases, the time threshold can be one minute, two minutes, three minutes, an hour, etc. As another example, the event can include an indication that the power tool has been powered on (e.g., a power button on the power tool has been actuated). In this way, the power tool can establish communication with a mesh network (e.g., to disseminate tool information therethrough) after the power tool is powered on.

As yet another example, the event can include the power tool 108 receiving a mesh mode message (e.g., using the electronic controller 210) and the antenna 240) requesting that the power tool enable a mesh communication mode. For example, the power tool 108 can receive the mesh mode message from a gateway power tool (e.g., the gateway power tool 102). The gateway power tool 102 can transmit the mesh mode message to the power tool 108 (and to other power tools) periodically or in response to a user request (e.g., input via a graphical user interface of a wireless communication device, which is received by the gateway power tool). The transmission can be a broadcast message in which gateway power tool 102 broadcasts the mesh mode message out to every power tool, or a subset of power tools that is in the direct communication range of the gateway power tool 102. In other cases, the transmission can include the gateway power tool 102 transmitting the mesh mode message specifically to the power tool 108. For example, the gateway power tool 102 can establish a communication channel with the power tool 108, and can transmit the mesh mode message to the power tool 108 over the communication channel (e.g., the mesh mode message being an addressed message that is addressed to the power tool 108). In some cases, the transmission can include establishing a one-to-one pairing between the power tool 108 and the gateway power tool 102, and based on the one-to-one pairing, the gateway power tool 102 can transmit the mesh mode message to the power tool 108.

In some embodiments, establishing communication with a mesh network in block 402 includes the power tool 108 entering a mesh communication mode in response to the event. In the mesh communication mode, the power tool 108 can be configured to listen for further mesh network messages via the antenna 240 and to retransmit such wireless messages that the power tool 108 receives via the antenna 240. Thus, in the mesh communication mode, the power tool 108 can be configured to propagate mesh network messages through the mesh network (e.g., to the gateway power tool, to other power tools and devices in the network, etc.). Conversely, when not in the mesh communication mode, the power tool 108 may ignore or otherwise not propagate mesh network messages (e.g., even when received at the antenna of the power tool 108). In some embodiments, entering the mesh communication mode can further include the power tool switching from a first wireless communication mode (e.g., a one-to-one Bluetooth® communication mode with another device), to a second wireless communication mode in which the power tool communicates via the mesh network (e.g., which can be a Bluetooth® mesh network).

In some embodiments, in block 402, in addition to or as part of entering the mesh communication mode, the power tool further begins communicating via a mesh network. In some cases, including if a mesh network has not been established, these communications can include the power tool 108 (and/or one or more of the gateway power tool 102, other power tools, etc.) communicating (e.g., one or more of identifier(s), synchronization information, and/or security information) to establish the mesh network that includes the additional power tool, the gateway power tool 102, one or more other power tools, etc. In this case, the mesh network then includes at least the power tool 108, the gateway power tool 102, and each other power tool that is either in direct communication with the gateway power tool 102 or the power tool 108. In some cases, the mesh network can further include other wireless communication devices or mesh nodes (e.g., that can act as intermediary nodes in the mesh network) and more power tools in indirect communication with the wireless communication device (e.g., via other power tools or the other wireless communication devices).

In some embodiments, the mesh network is ad-hoc in the sense that the power tool may not be aware of one or more other devices in the mesh network but, rather, opportunistically receives, processes, and transmits mesh network communications to/from other devices in the mesh network. In such cases, the power tool may not communicate or receive particular messages to establish the mesh network beyond receiving the previously described mesh mode message that results in the devices being configured to receive, process, and/or transmit mesh network communications. Accordingly, in some cases, the mesh network may be described as including each power tool (or other device) configured for mesh communication and within direct communication range of at least the gateway power tool 102 or one other power tool (or other device) configured for mesh communication.

In some embodiments, the process 400 can include disseminating the mesh mode message through some (or all) power tools of the mesh network. For example, after the power tool (e.g., the power tool 108) receives the mesh mode message in block 402, the power tool 108 can subsequently transmit the mesh mode message to other power tools (or other devices) in direct communication therewith. This reception and transmission of the mesh mode message can continue until each power tool or device in the mesh network receives the mesh mode message. For example, the power tool 108 can transmit the mesh mode message to the power tool 108, which can retransmit the mesh mode message to the power tool 110, which can retransmit the mesh mode message to the power tool 114.

In block 404, the process 400 can include the power tool 108 transmitting tool information to the additional power tool in the mesh network, via the mesh network. In some cases, the tool information can include tool information corresponding to the power tool 108, and can include tool information corresponding to each power tool in the mesh network or a subset of power tools in the mesh network. For example, other power tools in the mesh network (e.g., one or more of the power tools 104, 106, 110, 112, 114, 116, 118) can transmit, via the mesh network, tool information to the power tool 108, each of which can be associated with the respective power tool transmitting the tool information. The power tool 108 may receive the tool information from other tools in the mesh network directly or indirectly. For example, the power tool 108 may receive the tool information from the power tool 112 directly (e.g., when the power tool 112 is in direct communication range), and may receive the tool information from the power tool 114 indirectly via the power tool 112 (e.g., when the power tool 114 is outside of direct communication range). In some embodiments, the tool information can include, for each power tool, a tool identification of the respective tool, a total amount of time during operation of the respective tool, a total amount of time during actuation of an actuator of the respective tool, a total number of driving operations for an actuator of the respective tool, a location of the respective tool, an amount of time available for operation for a power tool relative to a battery level for the power tool, etc.

In block 406, the process 400 can include the power tool ceasing communication with the mesh network. In some cases, this cessation can include the power tool switching from a first wireless communicating mode in which the power tool can communicate via the mesh network (e.g., a mesh communication mode), to a second wireless communication mode in which the power tool can communicate directly with one or more wireless communication devices. Upon exiting the mesh communication mode, the power tool 108 may cease listening for mesh network communications from other power tools in the previously established mesh network and/or cease transmitting mesh network communications to other power tools in the previously established mesh network. The second wireless communication mode may be another communication mode other than the mesh communication mode. For example, the power tool 108 may enter a paired, one-to-one communication mode in which the power tool 108 pairs and communicates with a mobile device (e.g., a mobile phone, tablet, or the like). Additionally or alternatively, in some cases, the cessation in block 406 can include the power tool leaving the mesh network. Leaving the mesh network may include, for example, the power tool 108 ceasing of transmitting and/or receiving synchronization messages or keep alive messages that may be used to maintain the mesh network. In some examples, leaving the mesh network may include the power tool 108 transmitting an exit message to one or more other power tools in the mesh network indicating that the power tool 108 is exiting the mesh network.

In some embodiments, the block 406 can include the power tool waiting a period of time after ceasing communication with the mesh network. In some cases, after the period of time has elapsed, the power tool 108 can proceed back to the block 402 to establish communication with the mesh network (e.g., reestablish communication), or establish communication with a different mesh network, such as in the case that the mesh network of block 402 has been changed. In some cases, the elapsed time can be two minutes, three minutes, four minutes, five minutes, six minutes, seven minutes, eight minutes, etc. In some cases, the time for waiting the period of time at the block 406 and the elapsed time at the block 402 can alone or collectively define a frequency time (e.g., fifteen minutes, one hour, etc.) in which the process 400 is to repeat.

Accordingly, at least in some embodiments, by looping through the blocks 402, 404, and 406 of the process 400, the power tool 108 is configured to periodically establish (and then cease) communication with a mesh network of one or more other power tools to transmit tool information (of the power tool 108 and/or other power tools in the mesh network). Such tool information is ultimately received by a gateway power tool (e.g., the power tool 102) directly from the power tool 108 or indirectly via one or more other power tools of the mesh network, such as described with respect to FIG. 5 below.

Figure 5:
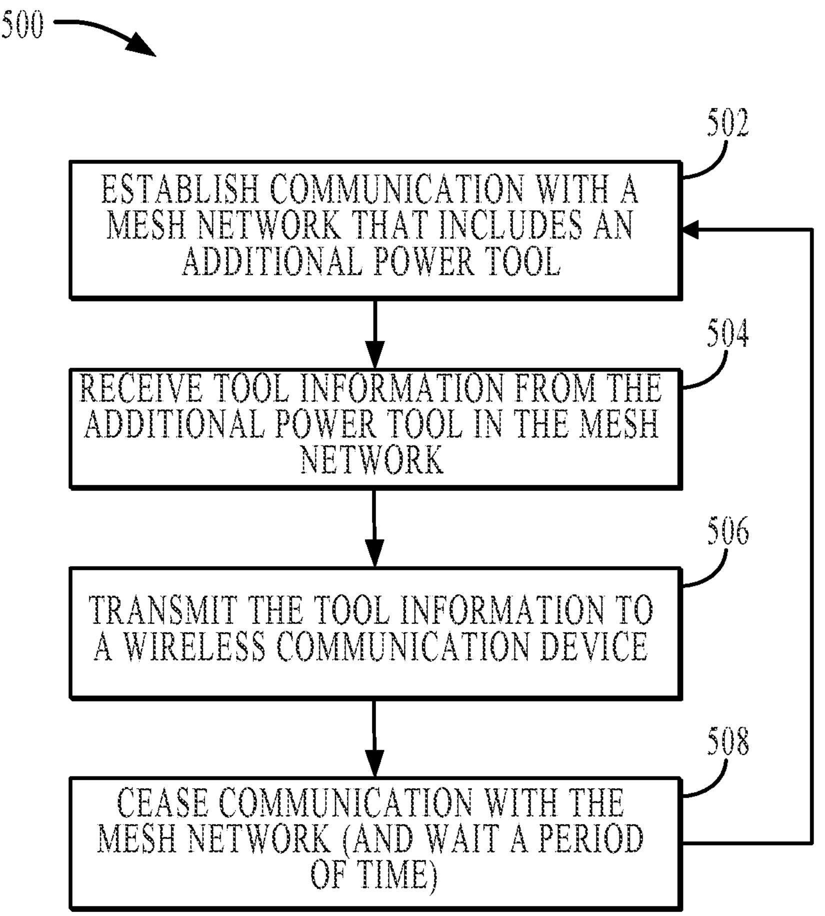
FIG. 5 shows a flowchart of another process for tool information retrieval.

FIG. 5 illustrates a flowchart of a process 500 for tool information retrieval for a location (e.g., a jobsite), which can be implemented using any of the systems described herein (e.g., the power tool system 100). However, in some embodiments, the process 500 can be implemented by another system having additional components, fewer components, alternative components, etc. In some specific cases, the process 500 can be implemented using a wireless communication device (e.g., the gateway power tool 102). Additionally, although the blocks of the process 500 are illustrated in a particular order, in some embodiments, one or more of the blocks can be executed partially or entirely in parallel, can be executed in a different order than illustrated in FIG. 5, or can be bypassed. For illustration purposes, the process 500 is generally described as being implemented by the gateway power tool 102 in the context of the power tool system 100 in FIG. 1. However, in other embodiments, other power tools in the system 100 (e.g., power tools 104, 106, 108, 110, 112, 114, 116, or 118) may serve as a gateway power tool and implement the process 500, or other wireless communication devices may implement the process 500.

In the block 502, the process 500 can include a gateway power tool (e.g., the gateway power tool 102) establishing communication with a mesh network that includes an additional power tool (e.g., and in some cases multiple additional power tools), which can be in response to an event (e.g., a mesh network triggering event). The block 502 can be similar to the block 402 of the process 400. For example, the event can be a time-based event, a determination that the gateway power tool 102 has been turned on, a determination that the gateway power tool 102 has received a mesh mode message, etc. In some cases, the gateway power tool 102 can establish communication with the mesh network using a first wireless communication protocol (e.g., a Bluetooth®, Zigbee, or another wireless communication protocol).

In the block 504, the process 500 can include the gateway power tool 102 receiving tool information from an additional power tool in the mesh network (e.g., from the power tool 108). In some cases, this reception of tool information can include receiving tool information from each additional power tool in the mesh network, via the mesh network. In some cases, this reception of tool information can include receiving the tool information, via the mesh network, as indicated at the block 404 of the process 400. In some configurations, the gateway power tool 102 can receive the tool information from the additional power tool in the mesh network using the first wireless communication protocol (e.g., a Bluetooth®, Zigbee, or another wireless communication protocol). In some configurations, with reference to FIG. 3, the gateway power tool 102 receiving the tool information includes the electronic controller 310 receiving the tool information using the first wireless communication protocol and via a first antenna of the antenna(s) 340.

In the block 506, the process 500 can include the gateway power tool transmitting the tool information to a wireless communication device (e.g., the access point 124 of the network 120). In some cases, this can include the gateway power tool 102 transmitting the tool information to the wireless communication device using a second wireless communication protocol (e.g., a cellular wireless communication protocol), which is different than the first wireless communication protocol. The tool information that is transmitted by the gateway power tool may ultimately be received by a remote server (e.g., the server 122). For example, the wireless communication device that receives the tool information from the gateway power tool may serve as an intermediate device that forwards the tool information to the server 122. The server 122 may store, analyze, and/or provide access to the received tool information. In some configurations, with reference to FIG. 3, the gateway power tool 102 transmitting the tool information includes the electronic controller 310 transmitting the tool information using the second wireless communication protocol and via the first antenna of the antenna(s) 340. In some configurations, the gateway power tool 102 transmitting the tool information includes the electronic controller 310 transmitting the tool information using the second wireless communication protocol and via a second antenna of the antenna(s) 340) that is different than the first antenna used to receive the tool information from the mesh network.

Additionally, at least in some embodiments, in the block 506, the gateway power tool 102 is configured to establish communication with a wireless communication device (e.g., establish a communication channel or link by exchanging identifier(s), synchronization information, and/or security information), to transmit the tool information to the wireless communication device, and then to cease communication with the wireless communication device (e.g., interrupt the communication channel or link). In some embodiments, the gateway power tool 102 has, and maintains, a communication channel or link with the wireless communication device (e.g., during the course of multiple loops through the process 500). The power tool 102 may also use this more persistent communication channel to transmit and/or receive additional information from the server 122.

In the block 508, the process 500 can include the gateway power tool 102 ceasing communication with the mesh network, which can be similar to the block 406 of the process 400. For examples, the gateway power tool 102 may switch wireless communication modes and/or leave the mesh network, such as described above with respect to the power tool 108 and the block 406. In addition, the block 508 can include the gateway power tool 102 waiting a period of time, and after waiting the period of time, proceeding back to the block 502 to establish communication with the mesh network (e.g., reestablish communication), or establish communication with a different mesh network, such as in the case that the mesh network of block 502 has been changed. In some cases, the gateway power tool 102 can cease communicating with the power tool 108 before the gateway power tool 102 transmits the tool information to the wireless communication device (e.g., the access point 124 of the network 120). In this way, the gateway power tool 102 may reduce, minimize, or eliminate use of power to communicate with the mesh network as the gateway power tool 102 prepares to transmit, and transmits, the tool information to the wireless communication device. In this case, for example, waiting the period of time can be completed after transmission of the tool information to the wireless communication device.

Accordingly, at least in some embodiments, by looping through the blocks 502, 504, 506, and 508 of the process 500, the gateway power tool 102 is configured to periodically establish (and then cease) communication with a mesh network of one or more other power tools to periodically receive tool information (e.g., from the power tool 108 and/or other power tools in the mesh network). Additionally, at least in some embodiments, by looping through the blocks 502, 504, 506, and 508 of the process 500, the gateway power tool 102 is configured to periodically establish (and then cease) communication with a wireless communication device to periodically transmit the tool information.

Figure 6:
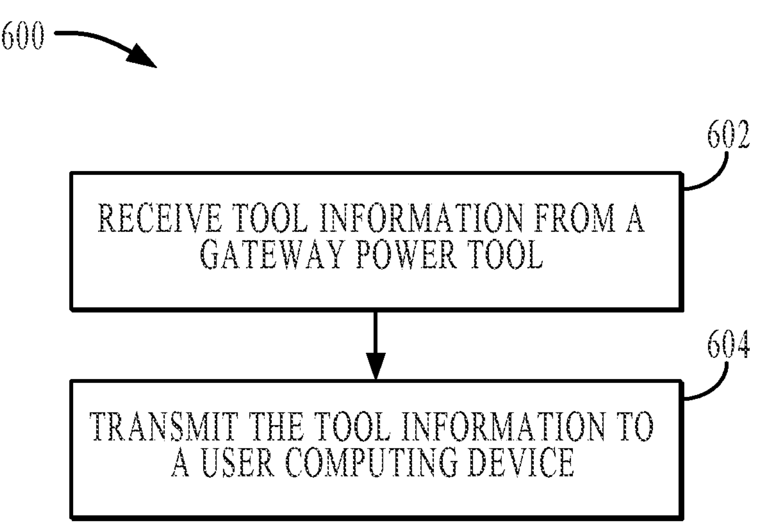
FIG. 6 shows a flowchart of another process for tool information retrieval.

FIG. 6 illustrates a flowchart of a process 600 for tool information retrieval for a location (e.g., a jobsite), which can be implemented using any of the systems described herein (e.g., the power tool system 100). However, in some embodiments, the process 600 is implemented by another system having additional components, fewer components, alternative components, etc. In some specific cases, the process 600 can be implemented using a server (e.g., the server 122). Additionally, although the blocks of the process 600 are illustrated in a particular order, in some embodiments, one or more of the blocks can be executed partially or entirely in parallel, can be executed in a different order than illustrated in FIG. 6, or can be bypassed.

In the block 602, the process 600 can include device server (e.g., the server 122) receiving tool information from a gateway power tool (e.g., the gateway power tool 102). In some cases, this can include the server 122 receiving the tool information transmitted by the gateway power tool 102 at the block 506 of the process 500. For example, the server 122 may receive the tool information, transmitted by the gateway power tool 102, from the network 120 via a network interface of the server 122. The network interface (e.g., an Ethernet interface, Wi-Fi interface, etc.) may connect the server 122 to an access point of the network 120 (e.g., a cellular tower, a router, or hub). The server 122 may further store the tool information. For example, a processor of the server 122 may store the tool information in a database maintained on a memory of the server 122.

In the block 604, the process 600 can include the server 122 transmitting the tool information to a user computing device. In some cases, this can include the server 122 transmitting the tool information via the network 120 to the user computing device (e.g., smartphone, tablet, or laptop). For example, a processor of the server 122 may retrieve the tool information previously stored on a memory of the server 122, and transmit the tool information via the network interface of the server 122 and the network 120 to the user computing device. In some embodiments, the server 122 transmits the tool information in response to a request from the user computing device or in response to another trigger. In some embodiments, the server 122 transmits the tool information for display or otherwise indicating the tool information on the user computing device. For example, the user computing device may display the tool information (in whole or in part) on an electronic display of the user computing device. In some examples, the user computing device may execute tool reporting software (e.g., a web browser software or a specific software application (an "app")) that generates a graphical user interface and that causes the user computing device to communicate with the server 122 (e.g., via the network 120). The graphical user interface may provide a user of the user computing device with an interface to request, view, and otherwise interact with the tool information stored on the server 122. For example, the user computing device may receive user input, via the graphical user interface, specifying particular information. The specified particular information may include the tool information from a database of information, a particular subset of the tool information, or a collection of tool information that includes the tool information as well as additional tool information for the tools of the mesh network of the gateway power tool 102 (e.g., for additional time periods) and/or for tools of one or more further mesh networks of power tools. For example, the specified particular information may identify one or more power tools or groups of tools, as well as a time period (e.g., a particular day, a particular month, the previous day, the previous week, the previous month, etc.). The tool reporting software may then transmit a request to the server 122 for the specified particular information. The server 122 may respond, as part of block 604, to transmit this specified particular information. The user computing device may then display the specified particular information on the graphical user interface of the tool reporting software.

While the disclosure has been mainly framed around power tools, it is also contemplated that the embodiments of the disclosure can be applied to tools in general (e.g., both powered and non-powered tools) and to power tool battery packs. For example, the power tool system 100 may include one or more non-powered tools (e.g., a wrench, a screwdriver, a ratchet, etc.) that can have attached thereto a power source (e.g., a battery) and a communication system. The communication system may include an electronic controller (similar to electronic controller 210) and an antenna (similar to antenna 240) to facilitate communication with other devices of the system 100 (e.g., the gateway power tool 102 and other power tools). In a specific case, the power source and the communication system can be coupled to a housing of a non-powered tool or can be located within the housing of the non-powered tool (e.g., within the handle of the non-powered tool). Accordingly, such non-powered tools may implement the process 400 of FIG. 4 and may be integrated into the process 500 of FIG. 5 (in a similar manner as power tools are integrated in the process 500).

Additionally or alternatively, the power tool system 100 may include one or more power tool battery packs similar to the power tool battery pack 244. As previously noted, the power tool battery pack 244 can include a pack electronic controller (pack controller) configured to communicate with other devices. For example, the power tool battery pack 244 may communicate with the gateway power tool 102 and/or other power tools or battery packs of the system 100 or 101. Accordingly, in some embodiments, the power tool battery pack 244 may implement the process 400 of FIG. 4 and may be integrated into the process 500 of FIG. 5 (in a similar manner as other power tools in the mesh network are integrated in the process 500). For example, in addition to transmitting tool information to the additional power tool that a power tool battery pack 244 may receive from power tools in the mesh network when executing the process 400, the power tool battery pack 244 may transmit battery pack information (e.g., number of charges, number of discharges, pack identifier, state of charge, etc.) regarding itself and/or pack information from other power tool battery packs 244 in the mesh network. In some examples, the mesh network includes a combination of one or more of power tools, non-powered tools, and/or power tool battery packs in communication with one or more wireless communication devices. In some examples, the mesh network can include only power tools, only non-powered tools, or only power tool battery packs in communication with one or more wireless communication devices. The term power tool device may be used to refer to a power tool (e.g., power tool 108), whether motorized or non-motorized, and/or to refer to a power tool battery pack that can attach to and power a power tool. Similarly, the term power tool device information may be used to refer to information that may include one or both of tool information and battery pack information.

In some embodiments, the power tool system 100 may implement the processes 400 and 500 in parallel. For example, the power tool 108 may execute the process 400 while the gateway power tool 102 executes the process 500. For example, the power tool may transmit messages as described in block 404, which are received by the gateway power tool in the block 506. In some embodiments, the power tool system 100 may implement the processes 400, 500, and 600 in parallel. For example, the power tool 108 may execute the process 400, while the gateway power tool 102 executes the process 500 and the server 122 executes the process 600. For example, the power tool 108 may transmit tool information as described in block 404, which is received by the gateway power tool 102 in the block 506, which is received by the server 122 in block 602.

It is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "front," or "back" features is generally intended as a description only of the orientation of such features relative to a reference frame of a particular example or illustration. Correspondingly, for example, a "top" feature can sometimes be disposed below a "bottom" feature (and so on), in some arrangements or embodiments. Further, references to particular rotational or other movements (e.g., counterclockwise rotation) is generally intended as a description only of movement relative a reference frame of a particular example of illustration.

In some embodiments, including computerized implementations of methods according to the disclosure, can be implemented as a system, method, apparatus, or article of manufacture using standard programming or engineering techniques to produce software, firmware, hardware, or any combination thereof to control a processor device (e.g., a serial or parallel processor chip, a single- or multi-core chip, a microprocessor, a field programmable gate array, any variety of combinations of a control unit, arithmetic logic unit, and processor register, and so on), a computer (e.g., a processor device operatively coupled to a memory), or another electronically operated controller to implement aspects detailed herein. Accordingly, for example, embodiments of the disclosure can be implemented as a set of instructions, tangibly embodied on a non-transitory computer-readable media, such that a processor device can implement the instructions based upon reading the instructions from the computer-readable media. Some embodiments of the disclosure can include (or utilize) a control device such as an automation device, a computer including various computer hardware, software, firmware, and so on, consistent with the discussion below. As specific examples, a control device can include a processor, a microcontroller, a field-programmable gate array, a programmable logic controller, logic gates etc., and other typical components that are known in the art for implementation of appropriate functionality (e.g., memory, communication systems, power sources, user interfaces and other inputs, etc.). Also, functions performed by multiple components can be consolidated and performed by a single component. Similarly, the functions described herein as being performed by one component can be performed by multiple components in a distributed manner. Additionally, a component described as performing particular functionality can also perform additional functionality not described herein. For example, a device or structure that is "configured" in a certain way is configured in at least that way, but can also be configured in ways that are not listed.

The term "article of manufacture" as used herein is intended to encompass a computer program accessible from any computer-readable device, carrier (e.g., non-transitory signals), or media (e.g., non-transitory media). For example, computer-readable media can include but are not limited to magnetic storage devices (e.g., hard disk, floppy disk, magnetic strips, and so on), optical disks (e.g., compact disk (CD), digital versatile disk (DVD), and so on), smart cards, and flash memory devices (e.g., card, stick, and so on). Additionally it should be appreciated that a carrier wave can be employed to carry computer-readable electronic data such as those used in transmitting and receiving electronic mail or in accessing a network such as the Internet or a local area network (LAN). Those skilled in the art will recognize that many modifications can be made to these configurations without departing from the scope or spirit of the claimed subject matter.

Certain operations of methods according to the disclosure, or of systems executing those methods, can be represented schematically in the figures or otherwise discussed herein. Unless otherwise specified or limited, representation in the figures of particular operations in particular spatial order can not necessarily require those operations to be executed in a particular sequence corresponding to the particular spatial order. Correspondingly, certain operations represented in the figures, or otherwise disclosed herein, can be executed in different orders than are expressly illustrated or described, as appropriate for particular embodiments of the disclosure. Further, in some embodiments, certain operations can be executed in parallel, including by dedicated parallel processing devices, or separate computing devices configured to interoperate as part of a large system.

As used herein in the context of computer implementation, unless otherwise specified or limited, the terms "component," "system," "module," etc. are intended to encompass part or all of computer-related systems that include hardware, software, a combination of hardware and software, or software in execution. For example, a component can be, but is not limited to being, a processor device, a process being executed (or executable) by a processor device, an object, an executable, a thread of execution, a computer program, or a computer. By way of illustration, both an application running on a computer and the computer can be a component. One or more components (or system, module, and so on) can reside within a process or thread of execution, can be localized on one computer, can be distributed between two or more computers or other processor devices, or can be included within another component (or system, module, and so on).

In some implementations, devices or systems disclosed herein can be utilized or installed using methods embodying aspects of the disclosure. Correspondingly, description herein of particular features, capabilities, or intended purposes of a device or system is generally intended to inherently include disclosure of a method of using such features for the intended purposes, a method of implementing such capabilities, and a method of installing disclosed (or otherwise known) components to support these purposes or capabilities. Similarly, unless otherwise indicated or limited, discussion herein of any method of manufacturing or using a particular device or system, including installing the device or system, is intended to inherently include disclosure, as embodiments of the disclosure, of the utilized features and implemented capabilities of such device or system.

As used herein, unless otherwise defined or limited, ordinal numbers are used herein for convenience of reference based generally on the order in which particular components are presented for the relevant part of the disclosure. In this regard, for example, designations such as "first," "second," etc., generally indicate only the order in which the relevant component is introduced for discussion and generally do not indicate or require a particular spatial arrangement, functional or structural primacy or order.

As used herein, unless otherwise defined or limited, directional terms are used for convenience of reference for discussion of particular figures or examples. For example, references to downward (or other) directions or top (or other) positions can be used to discuss aspects of a particular example or figure, but do not necessarily require similar orientation or geometry in all installations or configurations.

As used herein, unless otherwise defined or limited, the phase "and/or" used with two or more items is intended to cover the items individually and the items together. For example, a device having "a and/or b" is intended to cover: a device having a (but not b); a device having b (but not a); and a device having both a and b.

This discussion is presented to enable a person skilled in the art to make and use embodiments of the disclosure. Various modifications to the illustrated examples will be readily apparent to those skilled in the art, and the generic principles herein can be applied to other examples and applications without departing from the principles disclosed herein. Thus, embodiments of the disclosure are not intended to be limited to embodiments shown, but are to be accorded the widest scope consistent with the principles and features disclosed herein and the claims below. The following detailed description is to be read with reference to the figures, in which like elements in different figures have like reference numerals. The figures, which are not necessarily to scale, depict selected examples and are not intended to limit the scope of the disclosure. Skilled artisans will recognize the examples provided herein have many useful alternatives and fall within the scope of the disclosure.

Various features and advantages of the disclosure are set forth in the following claims.

The invention claimed is:

1. A power tool comprising:

a body;

an actuator coupled to the body;

an antenna coupled to the body; and an electronic controller coupled to the body and in communication with the antenna, the electronic controller including a processor, the processor configured to:

in response to an event that is specific to the power tool, establish communication with a mesh network that includes the power tool and a second power tool via the antenna, wherein the event that is specific to the power tool comprises an actuation of a power button on the power tool or an expiration of a time threshold that is specific to the power tool;

transmit, via the mesh network, power tool information to the second power tool;

cease communication with the mesh network after transmitting the power tool information to the second power tool via the mesh network;

wait a period of time after ceasing communication with the mesh network;

reestablish communication with the mesh network after waiting the period of time;

transmit, via the mesh network, second power tool information to the second power tool; and cease communication with the mesh network after transmitting the second power tool information to the second power tool via the mesh network.

2. The power tool of claim 1, wherein the processor is configured to:

wait the period of time after ceasing communication with the mesh network after transmitting the second power tool information to the second power tool via the mesh network;

establish communication with a second mesh network that includes the power tool and the second power tool after waiting the period of time after transmitting the second power tool information to the second power tool via the mesh network;

transmit, via the second mesh network, third power tool information to the second power tool; and cease communication with the second mesh network after transmitting the third power tool information to the second power tool via the second mesh network.

3. The power tool of claim 1, wherein ceasing communication with the mesh network includes the power tool leaving the mesh network.

4. The power tool of claim 1, wherein the power tool is not capable of communicating using a cellular communication protocol.

5. The power tool of claim 1, wherein:

the processor is configured to switch between a first wireless communication mode and a second wireless communication mode;

in the first communication mode, the processor is configured to directly communicate with one or more wireless communication devices; and in the second communication mode, the processor is configured to communicate via the mesh network.

6. The power tool of claim 1, wherein the mesh network is a Bluetooth mesh network.

7. The power tool of claim 1, wherein:

the second power tool is a gateway power tool that communicates with a wireless communication device using a first communication protocol; and the processor is configured to communicate with the gateway power tool over the mesh network using a second communication protocol different from the first communication protocol.

8. The power tool of claim 1, wherein the second power tool is a gateway power tool that communicates with a wireless communication device using a cellular communication protocol.

9. The power tool of claim 1, wherein the power tool information includes at least one of:

a tool identifier of the power tool;

a total amount of time during operation of the power tool;

a total amount of time during actuation of the actuator;

a total number of driving operations for the actuator;

a location of the power tool; or a battery level for the power tool.

10. The power tool of claim 1, wherein the event that is specific to the power tool comprises the actuation of the power button on the power tool.

11. The power tool of claim 1, wherein the event that is specific to the power tool comprises the actuation of the power button on the power tool, the expiration of the time threshold that is specific to the power tool, or a receipt of a mesh mode message from the second power tool.

12. The power tool of claim 1, wherein the event that is specific to the power tool comprises the expiration of the time threshold that is specific to the power tool.

13. The power tool of claim 1, wherein the processor is configured to:

receive third power tool information from a third power tool via the mesh network, the third power tool being located inside of direct communication range with the power tool and outside of direct communication range with the second power tool; and transmit, via the mesh network, the third power tool information to the second power tool.

14. The power tool of claim 1, wherein the time threshold that is specific to the power tool is different from the period of time.

15. A method for power tool information retrieval performed by a first power tool, the method comprising:

in response to an event that is specific to the first power tool, establishing communication with a mesh network that includes the first power tool and a second power tool, wherein the event that is specific to the first power tool comprises an actuation of a power button on the first power tool or an expiration of a time threshold that is specific to the first power tool;

transmitting, via the mesh network, power tool information to the second power tool;

ceasing communication with the mesh network after transmitting the power tool information to the second power tool via the mesh network;

waiting a period of time after ceasing communication with the mesh network;

reestablishing communication with the mesh network after waiting the period of time;

transmitting, via the mesh network, second power tool information to the second power tool; and ceasing communication with the mesh network after transmitting the second power tool information to the second power tool via the mesh network.

16. The method of claim 15, comprising:

waiting the period of time after ceasing communication with the mesh network after transmitting the second power tool information to the second power tool via the mesh network; and establishing communication with a second mesh network that includes the first power tool and the second power tool after waiting the period of time after transmitting the second power tool information to the second power tool via the mesh network.

17. The method of claim 15, wherein ceasing communication with the mesh network includes leaving the mesh network.

18. The method of claim 15, wherein the event that is specific to the first power tool comprises the actuation of the power button on the first power tool.

19. The method of claim 15, wherein the event that is specific to the first power tool comprises the expiration of the time threshold that is specific to the first power tool.

20. The method of claim 15, comprising:

receiving third power tool information from a third power tool via the mesh network, the third power tool being located inside of direct communication range with the first power tool and outside of direct communication range with the second power tool; and transmitting the third power tool information to the second power tool via the mesh network.

* * * * *